United States Patent
Nakatani et al.

(10) Patent No.: US 9,322,116 B2
(45) Date of Patent: Apr. 26, 2016

(54) APPARATUS FOR PRODUCING METAL OXIDE NANOFIBERS AND METHOD FOR PRODUCING METAL OXIDE NANOFIBERS

(75) Inventors: Masaya Nakatani, Hyogo (JP); Makoto Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 285 days.

(21) Appl. No.: 13/636,915

(22) PCT Filed: Apr. 25, 2011

(86) PCT No.: PCT/JP2011/002401
§ 371 (c)(1),
(2), (4) Date: Sep. 24, 2012

(87) PCT Pub. No.: WO2011/135824
PCT Pub. Date: Nov. 3, 2011

(65) Prior Publication Data
US 2013/0011318 A1 Jan. 10, 2013

(30) Foreign Application Priority Data

Apr. 27, 2010 (JP) ................................. 2010-101729

(51) Int. Cl.
| | | |
|---|---|---|
| C01B 33/20 | (2006.01) | |
| C01G 23/047 | (2006.01) | |
| C01F 7/02 | (2006.01) | |
| D01F 9/08 | (2006.01) | |
| C04B 35/622 | (2006.01) | |
| D01D 5/00 | (2006.01) | |
| C01B 33/18 | (2006.01) | |
| C01F 7/04 | (2006.01) | |

(52) U.S. Cl.
CPC .............. *D01F 9/08* (2013.01); *C04B 35/6224* (2013.01); *C04B 35/62231* (2013.01);

(Continued)

(58) Field of Classification Search
CPC ........ C01B 33/18; C01G 19/02; C01G 23/04; C01G 23/047; C01F 7/04
USPC ......... 423/325, 335, 608, 610, 609, 625, 618; 422/198
See application file for complete search history.

(56) References Cited

U.S. PATENT DOCUMENTS

| 2008/0299307 A1 | 12/2008 | Ward et al. | |
| 2009/0137433 A1* | 5/2009 | Smith et al. | ................... 507/271 |

(Continued)

FOREIGN PATENT DOCUMENTS

| EP | 2565311 A1 | 3/2013 |
| GB | 2055356 A | 3/1981 |

(Continued)

OTHER PUBLICATIONS

J. F. Al-Sharab et al., "Synthesis of Nanostructural Tungsten Oxide (WO2.9) Fibers and Discs," Cryst Growth Des, vol. 9, No. 11, Nov. 2009, p. 4680-4684.

(Continued)

*Primary Examiner* — Matthew E Hoban
*Assistant Examiner* — James Fiorito
(74) *Attorney, Agent, or Firm* — McDermott Will & Emery LLP (57) ABSTRACT

An apparatus for producing metal oxide nanofibers includes a jetting unit, a mixing unit, a heating unit, and a cooling unit. The jetting unit jets particles made of a metal. The mixing unit prepares a mixture by mixing the metal particles and a gas containing an oxidizing component that includes oxygen in molecules of the component. The heating unit heats the mixture to raise the temperature of the mixture up to a temperature at which the metal evaporates. The cooling unit cools the product thus-produced in the heating unit.

11 Claims, 4 Drawing Sheets

(52) U.S. Cl.
CPC .... *C04B 35/62236* (2013.01); *C04B 35/62259* (2013.01); *D01D 5/00* (2013.01); *C01B 33/18* (2013.01); *C01F 7/04* (2013.01); *C01G 23/047* (2013.01); *C04B 2235/40* (2013.01); *C04B 2235/402* (2013.01); *C04B 2235/404* (2013.01); *C04B 2235/428* (2013.01)

(56) References Cited

U.S. PATENT DOCUMENTS

| | | |
|---|---|---|
| 2009/0202427 A1 | 8/2009 | Katusic et al. |
| 2010/0219488 A1 | 9/2010 | Nakatani et al. |
| 2013/0017450 A1 | 1/2013 | Nakatani et al. |

FOREIGN PATENT DOCUMENTS

| | | |
|---|---|---|
| JP | 2009-114591 A | 5/2009 |
| JP | 2009-539753 A | 11/2009 |
| WO | WO-2004/099068 A2 | 11/2004 |
| WO | WO 2007144243 A1 * | 12/2007 |
| WO | WO-2009/034697 A1 | 3/2009 |

OTHER PUBLICATIONS

International Search Report issued in International Patent Application No. PCT/JP2011/002401 dated May 24, 2011.
Extended European Search Report issued in corresponding European Application No. 11774610.7, dated Nov. 6, 2013.

* cited by examiner

APPARATUS FOR PRODUCING METAL OXIDE NANOFIBERS AND METHOD FOR PRODUCING METAL OXIDE NANOFIBERS

RELATED APPLICATIONS

This application is the U.S. National Phase under 35 U.S.C. §371 of International Application No. PCT/JP2011/002401, filed on Apr. 25, 2011, which in turn claims the benefit of Japanese Application No. 2010-101729, filed on Apr. 27, 2010, the disclosures of which Applications are incorporated by reference herein.

TECHNICAL FIELD

The present invention relates to a method and apparatus both for producing nanofibers composed of metal oxides such as silicon dioxide. The nanofibers are used in a variety of electronic devices that require materials with heat insulation, heat resistance, and withstand voltage.

BACKGROUND ART

For processing oxide materials, such as silicon dioxide for example, into a nanofiber shape, there are applicable a chemical vapor deposition method (CVD method) and a vaporized substrate deposition method (VSD method). In the CVD method, fiber-shaped $SiO_2$ is grown in a gas phase at low pressures, using a gas including silicon (Si) as a raw material. For the raw material gas, for example, monosilane ($SiH_4$), disilane ($Si_2H_6$), tetraethoxysilane (TEOS), or the like are used. In the CVD method, each of metal oxide nanofibers are formed as a crystallized metal oxide (single crystals or polycrystals) with a needle shape. On the other hand, in the VSD method, an Si substrate on which a catalyst is formed is fired to evaporate Si from the Si substrate, thereby forming fiber-shaped $SiO_2$ by using the Si as the raw material. According to the VSD method, the resulting metal oxide is amorphous nanofibers and has a metal-oxide-nanofiber shape with high flexibility.

Note that Patent Literatures 1 and 2, for example, are known as prior art documents related to the present invention.

The VSD method is an excellent one because, without any expensive apparatus, it is capable of locally forming metal oxide nanofibers only at a desired place on a metal substrate. However, since atoms to be a raw material are supplied from the substrate in the VSD method, the method is limited for cases where the metal element configuring the metal oxide nanofibers is the same as that configuring the substrate. For $SiO_2$ nanofibers, for example, the usable substrate is limited to the Si substrate. Therefore, on a substrate freely-selected, it is difficult to form metal oxide nanofibers of a kind of metal different from that of the substrate.

Moreover, the VSD method requires that the substrate be heated up to a temperature at which the material evaporates therefrom. For example, when using a Si substrate as the metal substrate, the substrate needs to be subjected to a high-temperature treatment in firing, at temperatures of not less than 1000° C. Therefore, it is difficult to form metal oxide nanofibers on an object such as a substrate of glass or plastic, a structure of glass or plastic, and a composite structure including glass and plastic, with the glass and the plastic each having a lower melting point than the above temperatures.

In contrast, in the CVD method, raw materials that configure the metal oxide nanofibers are supplied in gas form. Therefore, the metal oxide nanofibers can be formed on an object relatively freely-selected including, for example, a glass, resin, and tin-doped indium oxide (ITO) substrates which have low heat resistance in particular. However, the method generally requires expensive apparatus so as to generate gas-plasma in vacuum and to control the distribution of the plasma; therefore, it is unsuitable for applications of forming nanofibers with high uniformity on a large-area substrate.

CITATION LIST

Patent Literatures

Patent Literature 1: WO 2004/099068
Patent Literature 2: WO 2009/034697

SUMMARY OF THE INVENTION

The present invention provides a method and apparatus for producing metal oxide nanofibers on a large-area object freely selected.

The apparatus for producing metal oxide nanofibers according to the present invention includes a jetting unit, a mixing unit, a heating unit, and a cooling unit. The jetting unit jets metal particles. The mixing unit mixes the metal particles and a gas containing an oxidizing component including oxygen in its molecules, thereby preparing a mixture. The heating unit heats the mixture up to a temperature at which the metal evaporates. The cooling unit cools the resulting product formed in the heating unit. Moreover, the method for producing metal oxide nanofibers according to the invention includes jetting metal particles, preparing a mixture, heating the mixture, and cooling the resulting product formed by the heating. When preparing the mixture, the particles are mixed with the gas that contains the oxidizing component including oxygen in its molecules. When heating the mixture, the temperature of the mixture is raised to a temperature at which the metal evaporates.

In the present invention, a raw material substrate such as that for a VSD method is not needed because the metal to be a raw material of the metal oxide nanofibers is supplied in particle form. The raw material of the metal oxide nanofibers is not limited to the material substrate. Moreover, the metal oxide nanofibers can be formed with high uniformity on a substrate (a deposited object) with a larger area than a CVD method.

DESCRIPTION OF EMBODIMENTS

Hereinafter, embodiments of the present invention will be described with reference to the drawings. It should be noted that the present invention is not limited to these embodiments.

Figure 1:
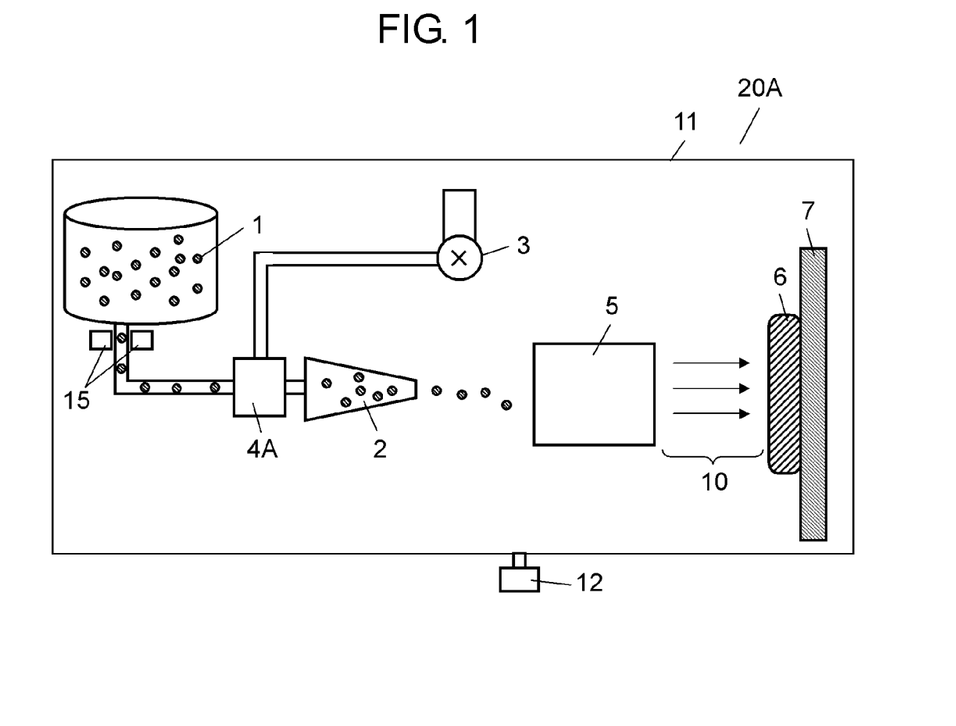
FIG. 1 is a schematic view of apparatus for producing metal oxide nanofibers according to an embodiment of the present invention.
Figure 2:
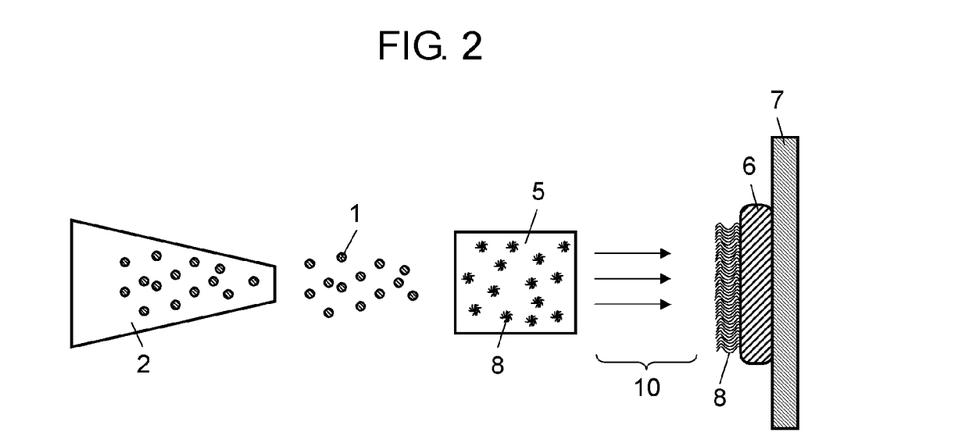
FIG. 2 is a conceptual view of a production procedure of the metal oxide nanofibers by using the production apparatus shown in FIG. 1.

FIG. 1 is a schematic view of apparatus for producing metal oxide nanofibers according to an embodiment of the present invention. FIG. 2 is a conceptual view of a production procedure of the metal oxide nanofibers by using the apparatus.

As shown in FIG. 1, the apparatus for producing metal oxide nanofibers (hereinafter, referred to as "production apparatus") 20A according to the present invention includes nozzle 2, mixing unit 4A, heating unit 5, table 7, cooling unit 10, chamber 11, and pressure reducing pump 12.

Nozzle 2 is a jetting unit that jets metal particles 1. Mixing unit 4A mixes particles 1 with gas 3 that contains an oxidizing component including oxygen in its molecules, thereby preparing a mixture. Specifically, mixing unit 4A mixes gas 3 and particles 1, and nozzle 2 jets the mixture prepared in mixing unit 4A.

Heating unit 5 heats the mixture to raise the temperature of the mixture up to a predetermined temperature. Table 7 is a holder to set object 6, i.e. a deposited object on which deposition is made, at a location a certain distance away from heating unit 5. A portion between heating unit 5 and table 7 functions as cooling unit 10 that cools a product formed by heating in heating unit 5. Particles 1, whose temperature has once been raised, are cooled to form fiber-shaped metal oxide nanofibers (hereinafter, referred to as nanofibers) 8 which reach object 6. That is, table 7 is the holder that holds the deposited object to receive nanofibers 8, i.e. the product formed by cooling in cooling unit 10.

Chamber 11 accommodates nozzle 2, mixing unit 4A, heating unit 5, cooling unit 10, and table 7. Pressure reducing pump 12 reduces the pressure of the inside of chamber 11.

Next, how nanofibers 8 are formed will be described with reference to FIG. 2. In mixing unit 4A, metal particles 1 to be a raw material are mixed with gas 3 that contains the oxidizing component including oxygen in its molecules. Then, the resulting mixture is jetted from nozzle 2, and heated in heating unit 5 up to a predetermined temperature, which thereby causes particles 1 to evaporate.

The predetermined temperature is a temperature at which particles 1 evaporates at a pressure of the inside of chamber 11. The pressure of the inside of chamber 11 is held in a rage of not higher than atmospheric pressure to not lower than approximately 100 Pa. Thus-evaporated metal atoms bond with oxygen contained in gas 3 to form a metal oxide. For example, when using Si as particles 1 and oxygen as gas 3, Si and oxygen are mixed and heated to form SiO (silicon suboxide), which is released into the atmosphere inside chamber 11. When the SiO is released from heating unit 5 and aggregated by cooling in cooling unit 10, it bonds with oxygen present in the atmosphere inside chamber 11 to form $SiO_2$, which is precipitated out as a solid component in fiber form, resulting in the formation of nanofibers 8. Then, the nanofibers adhere onto object 6 that is set in advance on table 7, resulting in the production of nanofibers 8 on object 6.

Although being different depending on the kind of metal, in the case where particles 1 are composed of Si, for example, nanofibers 8 of $SiO_2$ are formed when particles 1 are heated in heating unit 5 at temperatures ranging 1000° C. to 1500° C. Although nanofibers 8 are also once at high temperatures not lower than 1000° C. when formed, nanofibers 8 are sufficiently cooled down in cooling unit 10 before they reach object 6 set on table 7. Therefore, accidental heating of object 6 is unlikely to occur. For this reason, it is possible to form nanofibers 8 even on object 6 with low resistance to heat which is composed of such as glass, resin, or an ITO substrate. In this way, object 6 can be selected from a wider variety of materials. Moreover, differing from the case of a VSD method, the raw material of nanofibers 8 is not limited to object 6.

The pressure of the atmosphere of the inside of nozzle 2 is higher than that of the inside of chamber 11, i.e. the outside of nozzle 2, such that nozzle 2 is capable of jetting the mixture described above. To achieve this, the inside of nozzle 2 is pressurized by gas 3 supplied from mixing unit 4A, and the atmosphere of the inside of chamber 11 is decompressed with pressure reducing pump 12. That is, of the gas jetted from nozzle 2, the remaining gas that does not reacted with the vaporized components of particles 1 is exhausted to the outside of chamber 11 with pressure reducing pump 12 such that the pressure of the atmosphere of the inside of chamber 11, i.e. the outside of nozzle 2, is held lower than that of the inside of nozzle 2.

Note that, in heating the mixture of particles 1 and gas 3 with heating unit 5, when the pressure of the atmosphere inside heating unit 5 is set to be lower than atmospheric pressure, the temperature at which the metal configuring particles 1 evaporates decreases, so that the metal becomes easy to evaporate, resulting in more amount of nanofibers 8. This condition can be achieved by setting the pressure of the atmosphere inside chamber 11 to be lower than atmospheric pressure, with both heating unit 5 and table 7 being set in the chamber. With this configuration, the pressure of the atmosphere inside nozzle 2 is higher than that inside chamber 11, which preferably allows an easier jetting.

For $SiO_2$ for example, formation conditions of nanofibers 8 are determined from the following factors including: a vapor-pressure temperature of Si and SiO; a rate of gas-phase formation of SiO; and a rate of liquid-phase aggregation of SiO, which all are considered to vary depending on total pressure of the atmosphere and oxygen partial pressure. This allows precipitation of $SiO_2$ nanofibers with various sizes.

Note that, if the oxygen partial pressure in the process of holding temperature is excessively high, the vaporization of Si or the vaporization of SiO does not properly occur, which prevents the aggregation and precipitation thereof into $SiO_2$, leading to no formation of nanofibers 8. For this reason, in view of the vapor pressure of particles 1, both the pressure of the atmosphere and the oxygen partial pressure are particularly important parameters.

Note that, if the pressure of a region heated by heating unit 5 is low, the heat from heating unit 5 does not reach the region via thermal conductivity of the atmosphere. In this case, use of an infrared lamp or a microwave heater as heating unit 5 is enough to raise the temperature of particles 1.

Note that, for the oxidizing component of gas 3 which is necessary to form the oxide, gases such as nitrogen monoxide $N_2O$ and carbon monoxide CO other than oxygen are considered to be applicable provided that the gases each have oxidation action and are each capable of supplying oxygen. However, since these gases contain elements other than oxygen, they have an influence on the formation of the metal oxide and on the formation process of nanofibers 8. Therefore, the use of such the gases requires proper control of conditions including concentration, temperature, and pressure.

In this way, nanofibers 8 are formed in desired form by controlling parameters of the partial pressure and the temperature of gas 3. Note that the state of the precipitation varies depending on conditions including: the particle size and concentration of particles 1, the pressure of the atmosphere inside heating unit 5 and cooling unit 10 which both serve as a fiber forming region, the concentration of oxygen of the atmosphere, the temperature of the atmosphere, and the concentration of the intermediate product, SiO, which will vary as a result of the other conditions. Accordingly, it is possible to form nanofibers 8 with a desired fiber shape by changing the state of the precipitation.

For example, the diameter (thickness) of nanofibers 8 can be controlled by changing these conditions to change the state of the precipitation. The diameter of nanofibers 8 can be made to be approximately 10 nm to approximately 1 μm. Note that the length of nanofibers 8 can also be controlled by adjusting the conditions, and is generally 1 μm to 500 μm.

Note that, particles composed of a metal other than Si can be used, and is expected to form $TiO_2$ nanofibers when using Ti, $Al_2O_3$ nanofibers when using Al, and $SnO_2$ nanofibers when using Sn; their formation conditions vary depending on evaporation temperature and vapor pressure of Ti, Al, and Sn. In general, it is considered that, if oxygen is supplied at extremely higher concentrations than the vapor pressure of the metal material, the metal's chemical reaction is hard to occur in the vapor. On the other hand, since oxygen (oxygen atom) is essential for the formation of nanofibers 8, it is considered that the concentration of oxygen is favorably as high as the extent to which oxygen does not interfere with the formation of nanofibers 8.

Note that the amount of evaporation of particles 1 composed of the metal varies even at the same temperature and pressure of the atmosphere, because the surface area of the particles is different depending on their size and surface shape. For the case where nanofibers 8 are formed at lower temperatures and the diameter of nanofibers is made to be thin, particles 1 with a small particle size is efficiently used. In this way, the smaller the particle diameter of particles 1 is, the larger the ratio of the surface area thereof to the volume thereof is, leading to easier evaporation. Note that an excessively-small particle diameter of particles 1 results in an excessively-high rate of the evaporation. Therefore, the particle diameter of particles 1 is expected to be preferably not smaller than 1 μm. Specifically, the particle diameter of particles 1 is preferably not larger than 100 μm, and it has been confirmed that nanofibers 8 are actually formed using the particles with the diameter of 5 μm. In this way, the use of particles 1 as the raw material of nanofibers 8 has an advantage of high general versatility over uses of a gas-supply material and a substrate-supply material which both are utilized in methods for producing nanofibers 8 using conventional CVD methods.

As described above, as the particle size of particles 1 is smaller, the efficiency with which the metal configuring particles 1 is evaporated by receiving thermal energy from the atmosphere is higher. For this reason, particles 1 offer their highest evaporation efficiency when they are in contact only with the substance (gas 3) configuring the atmosphere.

Note, however, that a consequence of the contact of particles 1 with substances other than the atmosphere is not without formation of fibers. That is, particles 1 may be in contact with each other, and particles 1 may be in contact with members that configure heating unit 5. Even in the above cases, the fibers can be formed although the efficiency decreases compared to the case where the particles are in contact only with the substance configuring the atmosphere.

However, particles 1 are preferably isolated and dispersed as much as possible for increased uniformity, and are preferably not in contact with the members configuring heating unit 5. In order to prevent particles 1 from being in contact with substances other than the atmosphere as described above, vibrating unit 15 is arranged for supplied particles 1 in their way to nozzle 2, as shown in FIG. 1 for example. That is, it is preferable to arrange vibrating unit 15 that retards an aggregation of particles 1 supplied to nozzle 2. In this case, it is possible to retard the aggregation of particles 1 with each other. Alternatively, a laminar flow of gas 3 may also be formed along the inner wall of heating unit 5 to suppress particles 1 from being in contact with heating unit 5. These configurations are also applicable to the apparatus for producing metal oxide nanofibers, shown in FIGS. 3A to 5 to be described below.

Figure 3A:
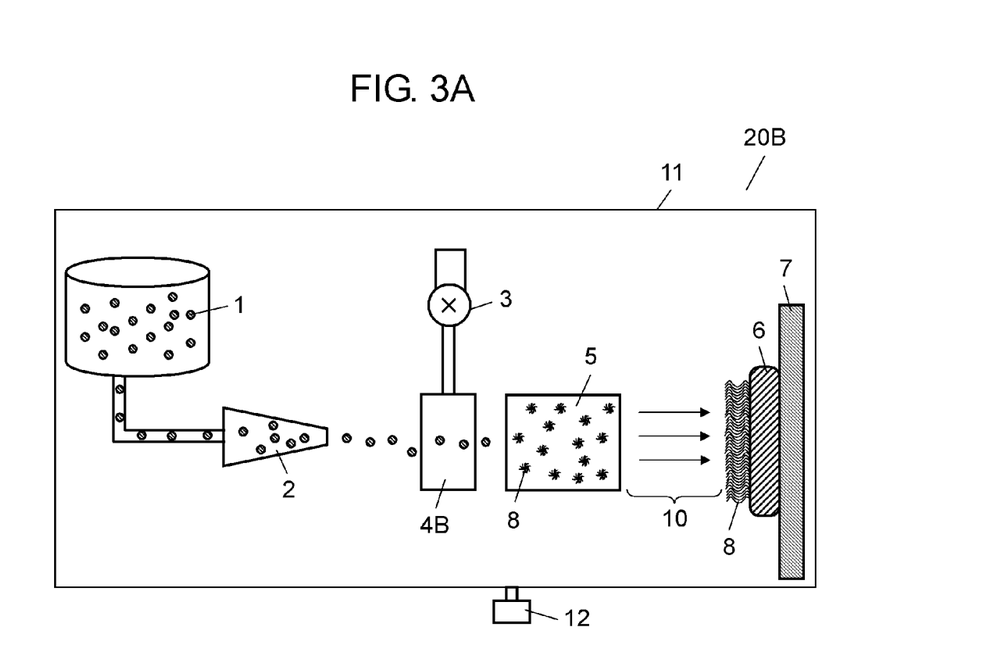
FIG. 3A is a schematic view of another apparatus for producing metal oxide nanofibers according to the embodiment of the invention.

Note that, as shown in FIG. 3A, mixing unit 4B may be arranged posterior to nozzle 2, instead of mixing unit 4A. FIG. 3A is a schematic view of another apparatus for producing metal oxide nanofibers according to the embodiment of the invention. In production apparatus 20B, nozzle 2 jets particles 1 directly into the atmosphere of gas 3. That is, mixing unit 4B mixes gas 3 and particles 1 jetted from jetting unit 2. In this case, use of an inert gas, e.g. nitrogen, as a carrier gas allows nozzle 2 to jet particles 1. Note that, in heating unit 5, the ratio of oxygen (oxidizing gas) to the total gas is set to be approximately 0.1 vol %.

Figure 3B:
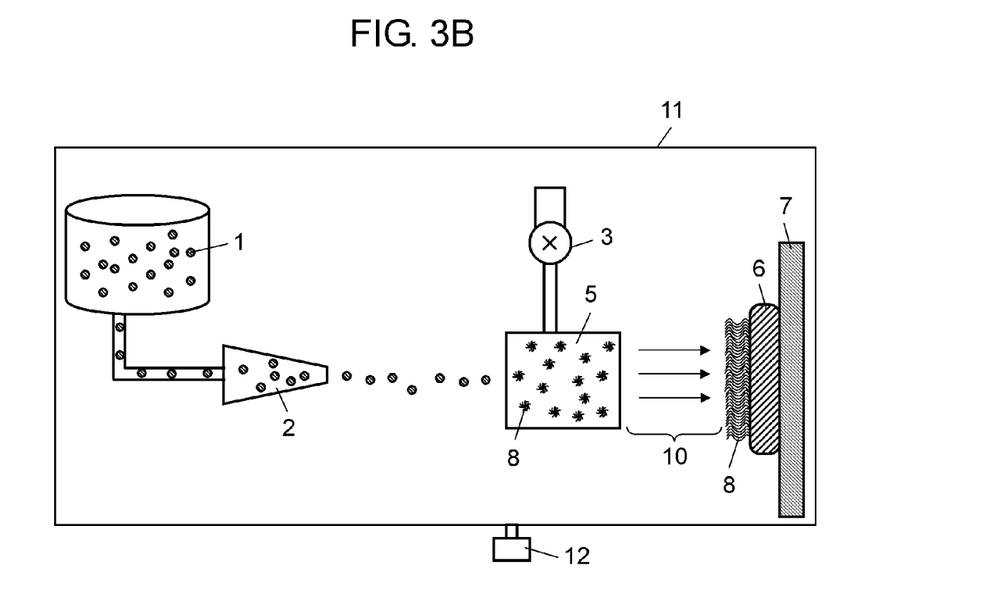
FIG. 3B is a schematic view of further another apparatus for producing metal oxide nanofibers according to the embodiment of the invention.

Moreover, as shown in FIG. 3B, gas 3 may be introduced into heating unit 5, without arranging any mixing unit independently. FIG. 3B is a schematic view of further another apparatus for producing metal oxide nanofibers according to the embodiment of the invention.

In this way, jetted particles 1 may be heated in the atmosphere of gas 3, which thereby allows the preparation of a mixture of gas 3 and particles 1 and, simultaneously, the heating of the mixture.

Figure 4A:
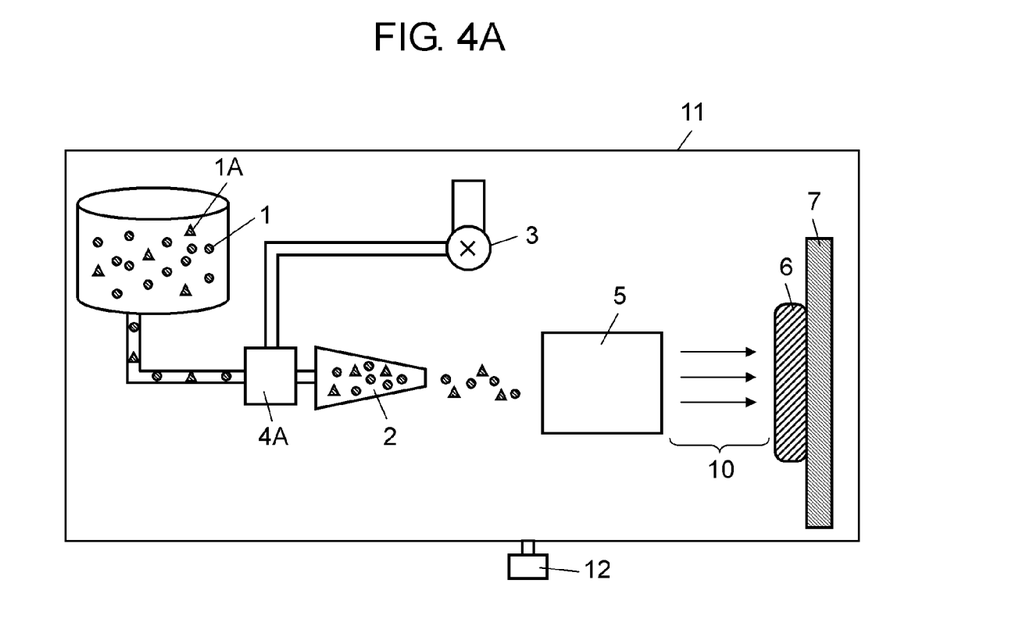
FIG. 4A is a schematic view of still another apparatus for producing metal oxide nanofibers according to the embodiment of the invention.
Figure 4B:
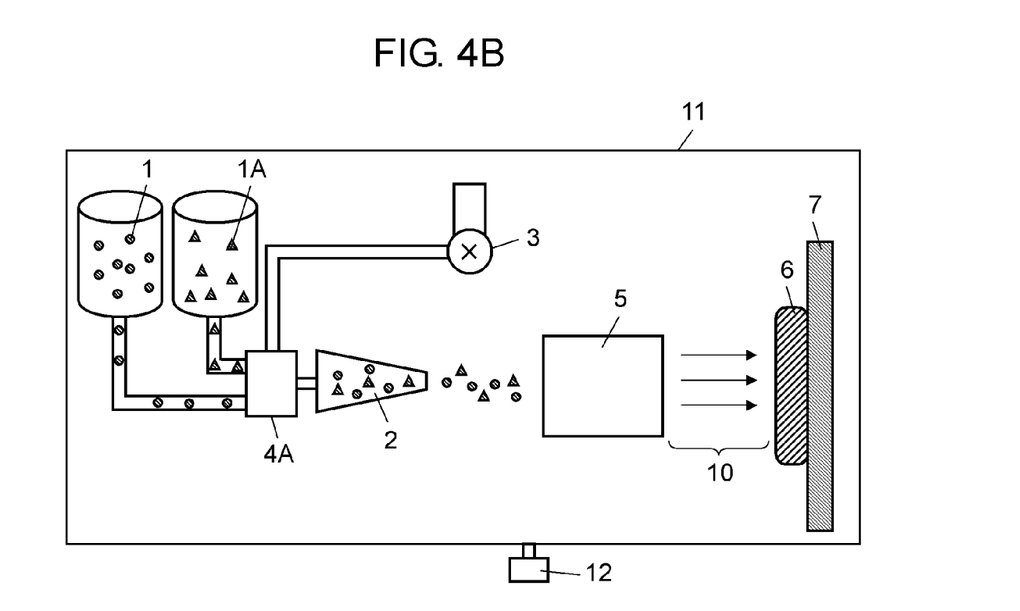
FIG. 4B is a schematic view of another apparatus for producing metal oxide nanofibers according to the embodiment of the invention.

Next, a configuration of a more preferable apparatus for producing metal oxide nanofibers will be described, with reference to FIGS. 4A and 4B. Each of FIGS. 4A and 4B is a schematic view of further another apparatus for producing metal oxide nanofibers according to the embodiment of the invention.

In the processes where particles 1 composed of the metal are evaporated, oxidized, and precipitated, particles 1A of a second metal are preferably introduced in a predetermined amount. The second metal has a higher boiling point than that of the metal configuring particles 1. After the evaporation, the metal configuring particles 1 is selectively aggregated on particles 1A made of the second metal, which allows an increase in the aggregation rate of the metal configuring particles 1, leading to the formation of nanofibers 8 with improved efficiency. As the second metal, it is possible to choose the kind of metal from such as platinum, gold, nickel, iron and the like. The choice must be properly made in accordance with the boiling point of the metal of particles 1 with which nanofibers 8 are formed. Particles 1A may be mixed with particles 1 in advance, as shown in FIG. 4A. Alternatively, particles 1 and particles 1A may be separately introduced into mixing unit 4A, as shown in FIG. 4B. Moreover, in the configuration shown in FIGS. 3A and 3B, a mixture of particles 1 and particles 1A may be supplied to nozzle 2.

Figure 5:
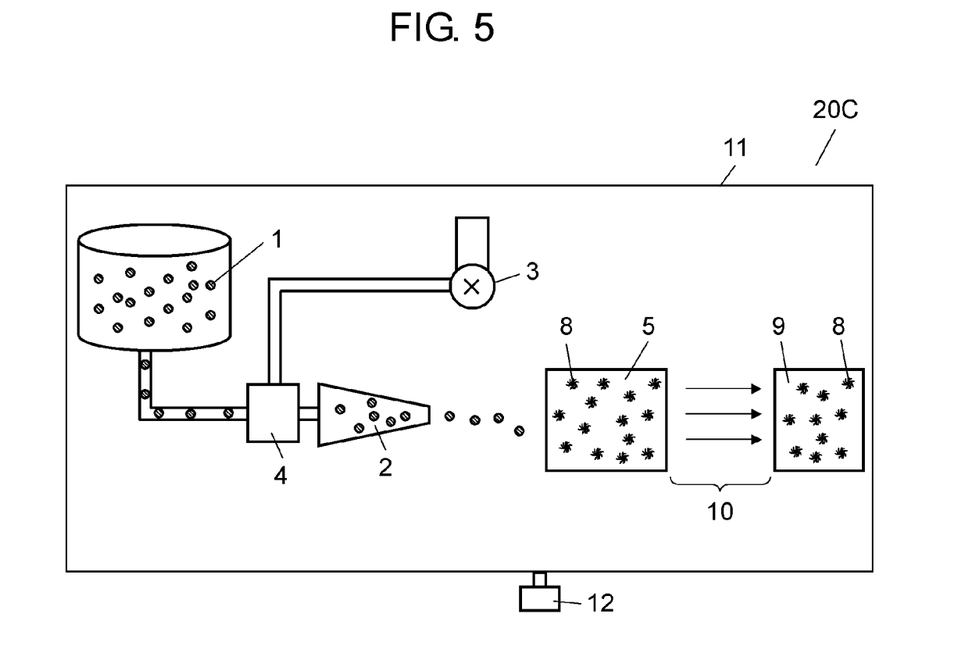
FIG. 5 is a schematic view of further another apparatus for producing metal oxide nanofibers according to the embodiment of the invention.

Next, an example of a modification of production apparatus 20A shown in FIG. 1 will be described, with reference to FIG. 5. FIG. 5 is a schematic view of still another apparatus for producing metal oxide nanofibers according to the embodiment of the invention.

In production apparatus 20A shown in FIG. 1, nanofibers 8 are formed on object 6 that is a substrate composed of a material, i.e. glass or resin for example, with a lower melting point than the temperature of formation of the nanofibers. In contrast, in production apparatus 20C shown in FIG. 5, nanofibers 8 are not deposited on a specific object 6, but nanofibers 8 are captured by reservoir 9.

That is, reservoir 9 is arranged instead of table 7. Reservoir 9 for capturing nanofibers 8 are arranged a certain distance away from heating unit 5. That is, cooling unit 10 is arranged between heating unit 5 and reservoir 9, and particles 1 having raised in temperature once are cooled down to form fiber-shaped nanofibers 8 which reach reservoir 9. When reaching reservoir 9 through cooling unit 10, nanofibers 8 are in a cooled state. Therefore, reservoir 9 is capable of capturing nanofibers 8 without aggregation thereof.

In reservoir 9, a liquid such as water, oil, or liquid paraffin is reserved. The liquid reserved in reservoir 9 is selected in accordance with the setting pressure of the inside of chamber 11. The liquid with a low boiling point and a high vapor pressure tends to evaporate when the pressure of the inside of chamber 11 is set to be low, on the one hand; the liquid is easy to be removed after capturing nanofibers 8, on the other hand. In contrast, the liquid with a high boiling point and a low vapor pressure is hard to be removed after capturing nanofibers 8, on the one hand; the liquid is usable even when the pressure of the inside of chamber 11 is set to be rather low, on the other hand.

Thus-captured nanofibers 8 can also be mixed and dispersed, in a predetermined amount, in a solution by a downstream process, for example. Such the microfibers are usable for applications that require a large surface area in the solution.

For example, when nanofibers 8 are coated with a metal thin-film, the metal thin-film takes a nanosized structure. Such the thus-coated material is usable as a material that shows a localized plasmon resonance (LPR) phenomenon, for example. In this case, by examining its resonance state by utilizing a plasmon effect, physical changes at its surface (for example, changes in dielectric constant due to adhesion of substances, changes in thickness of a metal thin-film, etc.) can be detected with high sensitivity.

Alternatively, if probe materials which are each capable of adsorbing a specific substance are disposed to adhere to the surface of nanofibers 8, it is possible to easily trap the specific substances in a solution, with the substances being absorbed by the corresponding probe materials. For example, if substances such as antigenic proteins, single-stranded DNA, and peptides are disposed to adhere to the surface of nanofibers 8, it is possible to easily trap such as proteins, DNA, and peptides in the solution. Detection of these substances can be made with high accuracy because nanofibers 8 are extremely thin and have a large surface area that allows easy osmosis of the solution.

Note that, in FIGS. 1 to 4B, particles 1 are configured to travel and jet in the horizontal direction to form nanofibers 8. Other than the configuration, it is possible that table 7 is arranged under heating unit 5 to support object 6 and that thus-formed nanofibers 8 adhere to object 6. Such the configuration allows nanofibers 8 to utilize gravity in adhering onto object 6, and therefore is usable. Moreover, such the arrangement may be employed in the configuration of FIG. 5.

INDUSTRIAL APPLICABILITY

Use of the apparatus for producing metal oxide nanofibers according to the present invention allows an easy production of the metal oxide nanofibers. Such the metal oxide nanofibers can be used, for example, as the material of a chemical-holding member in an assay plate used for high-sensitivity detection of proteins. Such the assay plate is often configured with a material with a low melting point, such as resin or glass. Accordingly, the apparatus is useful, for example, for producing plates that are used in a variety of measurement systems including a chemical-screening device and a diagnosis device.

REFERENCE MARKS IN THE DRAWINGS 1, 1A particle
2 nozzle (jetting unit)
3 gas
4A, 4B mixing unit
5 heating unit
6 object (deposited object)
7 table
8 metal oxide nanofiber (nanofiber)
9 reservoir
10 cooling unit
11 chamber
12 pressure reducing pump
15 vibrating unit
20A, 20B, 20C apparatus for producing metal oxide nanofibers (production apparatus)

The invention claimed is:

1. A method for producing metal oxide nanofibers, the method comprising steps of:
   jetting particles made of a first metal;
   preparing a mixture by mixing the particles and a gas containing an oxidizing component including oxygen in a molecule of the oxidizing component;
   heating the mixture to raise a temperature of the mixture up to a temperature at which the first metal evaporates and is suboxidized, the first metal is suboxidized to form a suboxide of the first metal; and
   cooling the suboxide formed by the heating so as to form metal oxide nanofibers,
   wherein in cooling the suboxide formed by the heating, the suboxide is cooled and further oxidized into oxide in the gas containing the oxidizing component, and thereby forming the metal oxide nanofibers, and the first metal is one of Si, Ti, and Al.

2. The method for producing metal oxide nanofibers according to claim 1, wherein the particles made of the first metal are jetted in a state of the mixture.

3. The method for producing metal oxide nanofibers according to claim 1, wherein, when the mixture is prepared, the jetted particles and the gas are mixed.

4. The method for producing metal oxide nanofibers according to claim 1, wherein preparing the mixture and heating the mixture are carried out by heating the jetted particles in an atmosphere of the gas.

5. The method for producing metal oxide nanofibers according to claim 1, wherein the cooled product is received by an object for the nanofibers to adhere to a surface of the object.

6. The method for producing metal oxide nanofibers according to claim 1, wherein the cooled product is received by a reservoir for the nanofibers to be stored in the reservoir.

7. The method for producing metal oxide nanofibers according to claim 1, wherein, when the particles are heated, the particles are in contact only with the gas.

8. The method for producing metal oxide nanofibers according to claim 1, wherein, when the particles of the first metal are jetted, the particles of the first metal and particles of a second metal having a higher boiling point than that of the first metal are mixed and jetted.

9. The method for producing metal oxide nanofibers according to claim 1, wherein, the gas, the particles of the first metal, and particles of a second metal having a higher boiling point than that of the first metal are mixed, when the gas and the particles of the first metal are mixed together for preparing the mixture.

10. The method for producing metal oxide nanofibers according to claim 1, wherein the first metal is Si.

11. A method for producing silicon dioxide nanofibers, the method comprising steps of:
- jetting metallic silicon particles;
- preparing a mixture by mixing the metallic silicon particles and a gas containing an oxidizing component including oxygen in a molecule of the oxidizing component;
- heating the mixture to raise a temperature of the mixture up to a temperature at which the metallic silicon particles evaporate and are suboxidized to form a silicon suboxide; and
- cooling the silicon suboxide and further oxidizing the silicon suboxide in the gas containing the oxidizing component, and thereby forming the silicon dioxide nanofibers.

* * * * *